United States Patent [19]

Kurokawa et al.

[11] Patent Number: 5,542,049
[45] Date of Patent: Jul. 30, 1996

[54] PROGRAMMABLE CONTROLLER

[75] Inventors: Naohiro Kurokawa, Shibata; Ryoichi Uchiyama, Niigata-ken, both of Japan

[73] Assignee: Hitachi, Ltd., Tokyo, Japan

[21] Appl. No.: 968,678

[22] Filed: Oct. 30, 1992

[30] Foreign Application Priority Data

Nov. 1, 1991 [JP] Japan .................. 3-287942

[51] Int. Cl.$^6$ .................. G05B 19/04; G06F 13/00
[52] U.S. Cl. .................. 395/280; 364/DIG. 1; 364/DIG. 2; 307/40; 219/130.1
[58] Field of Search .................. 395/250, 200; 219/130; 307/40; 364/141, DIG. 1; 326/31

[56] References Cited

U.S. PATENT DOCUMENTS

| 4,381,456 | 4/1983 | Saito et al. .................. 307/40 |
| 4,951,250 | 8/1990 | Cruickshank et al. .................. 395/275 |
| 5,149,940 | 9/1992 | Davis et al. .................. 219/130.21 |

FOREIGN PATENT DOCUMENTS

| 0447776 | 9/1991 | European Pat. Off. . |
| 59-146305 | 8/1984 | Japan . |
| 64-46805 | 3/1989 | Japan . |
| 1237702 | 9/1989 | Japan . |
| 2241126 | 8/1991 | United Kingdom . |

OTHER PUBLICATIONS

Patent Abstracts of Japan, vol. 10, No. 298, (P–505) (2354) Oct. 9, 1986 & JP-A-61-115 101 (Toshiba Mach Co. Ltd.) Jun. 2, 1986.

Patent Abstracts of Japan, vol. 13, No. 570 (P–977) Dec. 18, 1989, & JP-A-12 37 702 (Hitachi Ltd) Sep. 22, 1989.

Primary Examiner—Gail O. Hayes
Assistant Examiner—Felicia Ives
Attorney, Agent, or Firm—Antonelli, Terry, Stout & Kraus

[57] ABSTRACT

A programmable controller comprises an input circuit including a plurality of signal input terminals which receive signals from a plurality of external input devices, and a power feed terminal and a ground terminal which are respectively exposed in order to supply a power source voltage from outside the programmable controller. Also, current regulator elements are respectively located between the power feed terminal or the ground terminal and the plurality of signal input terminals. Owing to this construction, the range of power source voltages to be supplied to the input circuit can be widened, and various external input devices can be connected without altering internal circuitry. A plurality of power sources of fixed voltages which are generally used are built in, whereby a user need not especially prepare a power source and can be freed from the labors of wiring etc. The programmable controller can be readily conformed to the specifications of the external input devices, making it easy to cope with these devices. Since unidirectional photocouplers which are economical may be employed, the programmable controller can be constructed at low cost. Moreover, since the transfer ratios of the input signals can be held constant, a stable performance can be attained.

11 Claims, 7 Drawing Sheets

PROGRAMMABLE CONTROLLER

BACKGROUND OF THE INVENTION

The present invention relates to programmable controllers. More particularly, it relates to the input circuit of a programmable controller for making it possible to select the power source voltage of an external input device and to use various external input devices.

In general, a programmable controller is constructed as shown in FIG. 6, having an input unit 1 which accepts the signals of external input devices 2 and 3 (in the figure, the output portions of the external input devices are respectively represented by the electronic switch 2 and contact 3 thereof), a control unit 100 which arithmetically or logically processes the signals accepted by the input unit 1, a sequence program memory 102 which stores therein a sequence program for stipulating the procedures of the logical processes of the control unit 100, and an output unit 103 which transmits the logically processed results of the control unit 100 to external loads 104 on the basis of the contents of the memory 102. The sequence program to be stored in the sequence program memory 102 is set by a programming unit 101 and is transferred to this memory in advance. The control unit 100 constitutes a processor means and executes the sequence program stored in the memory 102.

Numeral 105 denotes an A.C. power source.

An input circuit included in the input unit 1 of such a programmable controller has heretofore been as illustrated in FIG. 7. It is constructed of a power source 9, a limiting resistor 106, a photocoupler 18 which serves to optically transmit the signals for the purpose of isolation, a capacitor 22 and a resistor 21 which reduce noise, and a limiting resistor 20 for the photocoupler 18.

With the above construction, when the voltage specifications of the external input devices 2 and 3 are different, the transfer characteristic of the photocoupler 18 changes. This poses the problem that the resistance of the resistor 106 must be changed, or that the resistor 106 generates heat in proportion to the square of the power source voltage 9 when the resistance of the resistor 106 is held constant. Mentioned as a method of solving this problem is a technique which is disclosed in the official gazette of Japanese Utility Model Registration Application Laid-open No. 46805/1989. According to this technique, an input terminal is furnished with two common terminals, and either of two levels of D.C. input voltage is selected by appropriately using the common terminals.

In addition, the official gazette of Japanese Patent Application Laid-open No. 146305/1984 discloses a technique wherein a current regulator circuit is connected in series with an LED (light emitting diode) disposed on the input side of the photocoupler, whereby current to be fed to the input side LED is held substantially constant for many levels of input signal voltages having different voltage values.

Further, the official gazette of Japanese Patent Application Laid-open No. 237702/1989 discloses a technique wherein the magnitude of a detection reference threshold voltage for an input signal voltage is changed by a voltage control circuit, depending upon the fluctuation of an input voltage level, whereby the input signal voltage is reliably detected in spite of the level fluctuation thereof.

With the known example stated in the official gazette of Japanese Utility Model Registration Application Laid-open No. 46805/1989, the specifications of the input voltages are fixed to two voltage levels, for example, 24 V and 12 V. This has led to the drawback that, when accepting the external signal of a TTL (transistor-transistor logic) circuit (based on 5 V), the resistor 106 shown in FIG. 7 must be altered for the purpose of causing a stipulated current to flow. Moreover, the conventional power source of 24 V must be prepared outside the programmable controller in order to avoid the fixation thereof to one sort of power source. This has been very inconvenient to the users of such programmable controllers.

In addition, according to the prior-art technique in the official gazette of Japanese Patent Application Laid-open No. 146305/1984, the alteration of the resistor 106 is dispensed with. However, when the current regulator circuits as disclosed herein are applied to the respective photocouplers, increase in the number of external input points has incurred the problems of a large packaging area and a high cost.

Besides, in any of the known examples stated above, the direction in which the current of the photocoupler flows is fixed. This has led to the problem that the different specifications of the external input devices, for example, a current absorption type (sink type) and a voltage output type (source type) make it necessary to alter the components of the input circuit or to employ a bidirectional photocoupler, which is expensive.

SUMMARY OF THE INVENTION

An object of the present invention is to provide a programmable controller comprising an input circuit which can cope with a plurality of input voltages without altering any component thereof and whose packaging area can be made comparatively small.

Another object of the present invention is to provide a programmable controller comprising an input circuit which can be used without altering any component thereof, irrespective of whether an external input device is of the sink type or of the source type.

In order to accomplish the objects, a programmable controller according to the present invention comprises memory means for storing a sequence program to operate external loads connected with the programmable controller; processor means connected with the memory means for executing the sequence program stored in the memory means; output means connected with the processor means for delivering processed results of the processor means to the external loads; and an input circuit connected with the processor means for receiving a signal from an external input device, wherein the input circuit includer a signal input terminal which receives the signal from the external input device; input signal generating means disposed between the signal input terminal and the processor means for generating and delivering an input signal to the processor means in accordance with the signal; and a current regulator element disposed between the input terminal and the input signal generating means.

The current regulator element has the property that, when a voltage is applied, the element has its internal impedance changed in accordance with the voltage and causes a constant current to flow. Accordingly, any desired voltage can be applied to the circuit while a current to flow to the signal input terminal is held constant, without replacing a resistor etc. Therefore, the input circuit is not susceptible to changes in the length of a signal line and neither is its noise immunity spoilt. Moreover, the current regulator element is a single element of small size and suffices with a smaller packaging area compared with a current regulator circuit in the prior art composed of a number of elements. This can contribute to reduction in the size of the programmable controller.

In addition, to make it more convenient for the user of the programmable controller, a power source voltage which is used comparatively frequently is prepared in the form of an internal power source, which can be utilized instead of an external power source connected to the power feed terminal.

Further, the input circuit can include a comparator and a photocoupler. Owing to the use of the comparator, the power source voltage of the input side LED of the photocoupler can be set separately from the power source voltage of the input circuit, and the ON current of the LED can be kept constant. Likewise, owing to the use of the comparator, the current direction conforming to the source type or the sink type external input device can be changed-over irrespective of the direction of current which flow through the LED of the photocoupler. The change-over of the current direction conforming to the types of external input device can be effected by switching the sign or polarity of the power source for the external input device or by switching the polarity of the current regulator element (or adopting bidirectional current regulator element). Incidentally, the polarity of a signal which is delivered as an output from the photocoupler becomes opposite depending upon the types of the external input device, but this situation can be coped with by inverting the output signal of the photocoupler for one of the types. A process for the inversion can easily be executed in software or hardware.

Still further, the input circuit can include a resistor which is connected in parallel with the current regulator element. Thus, even when the rated current of the current regulator element is small, the value of a circuit current can be increased.

DESCRIPTION OF THE PREFERRED EMBODIMENTS

Now, embodiments of the present invention will be described in detail.

Figure 8:
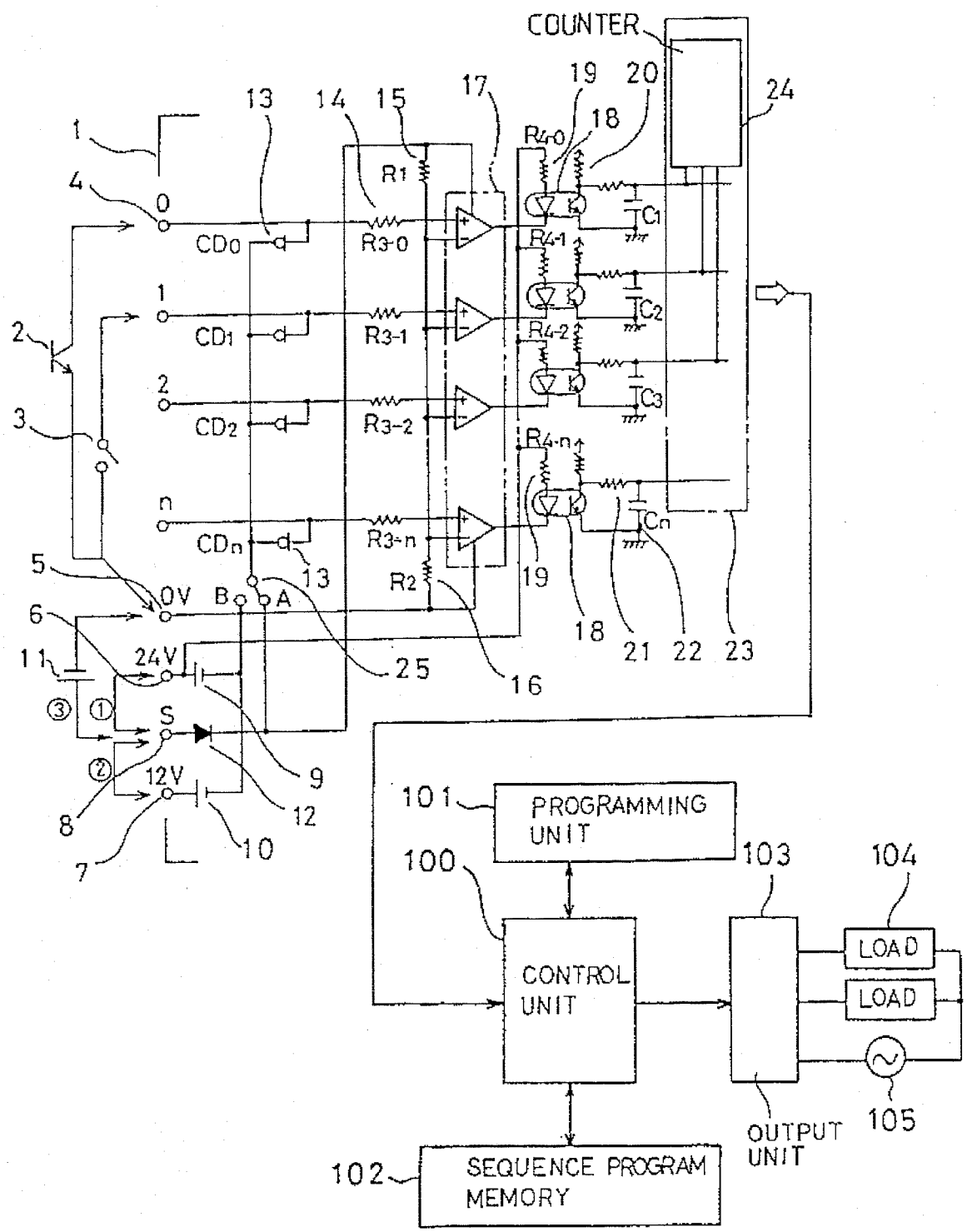
FIG. 8 is a block diagram showing the construction of an embodiment of the programmable controller according to the present invention.

FIG. 8 illustrates the construction of one embodiment of a programmable controller according to the present invention. In the figure, the same constituents as in FIG. 6 have the same reference numerals affixed thereto. This programmable controller features the portion of its input unit 1, which will be described with reference to FIG. 1 showing the arrangement thereof separately.

Figure 1:
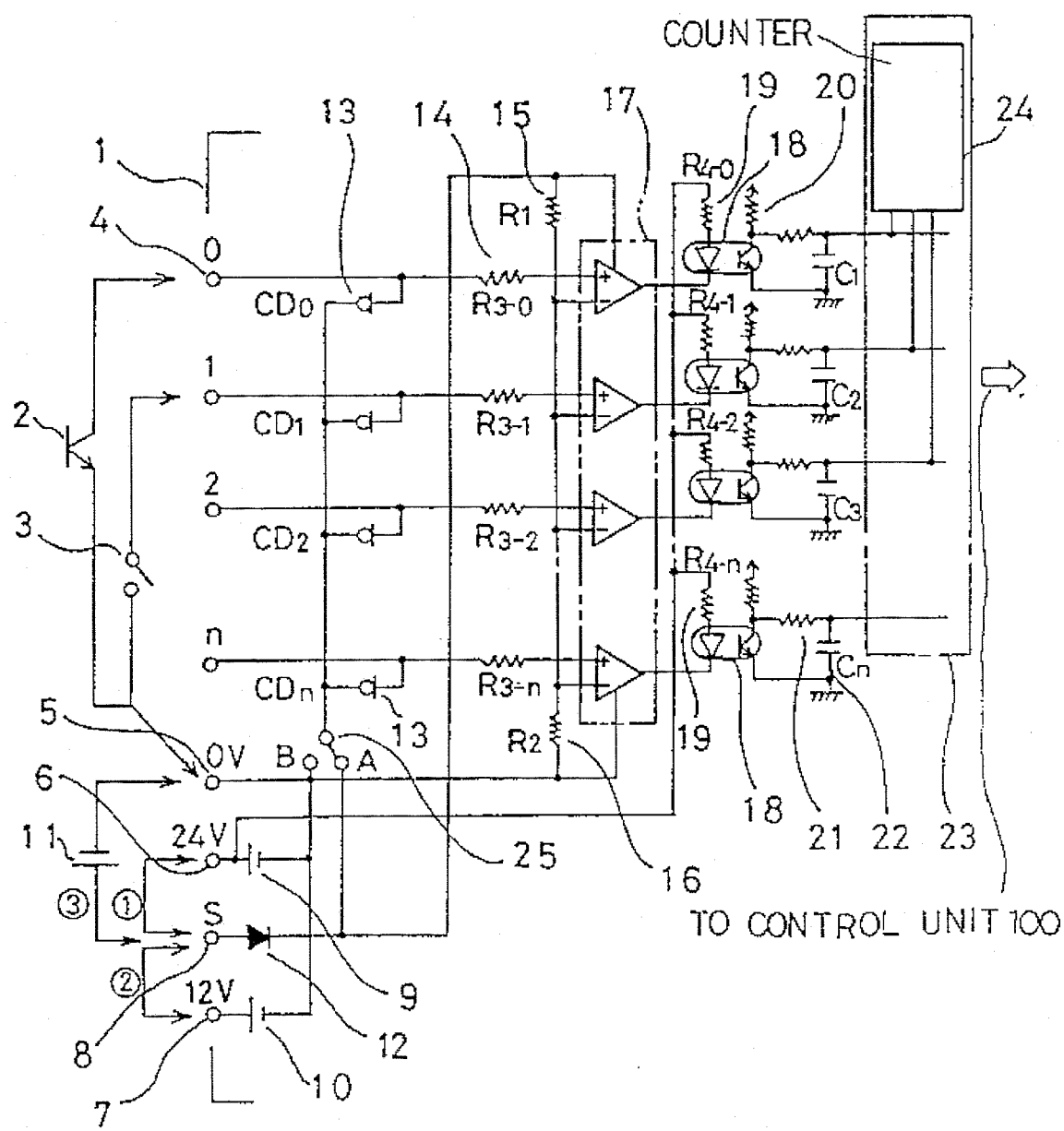
FIG. 1 is a circuit diagram showing the first embodiment of the input circuit of a programmable controller according to the present invention.
Figure 6:
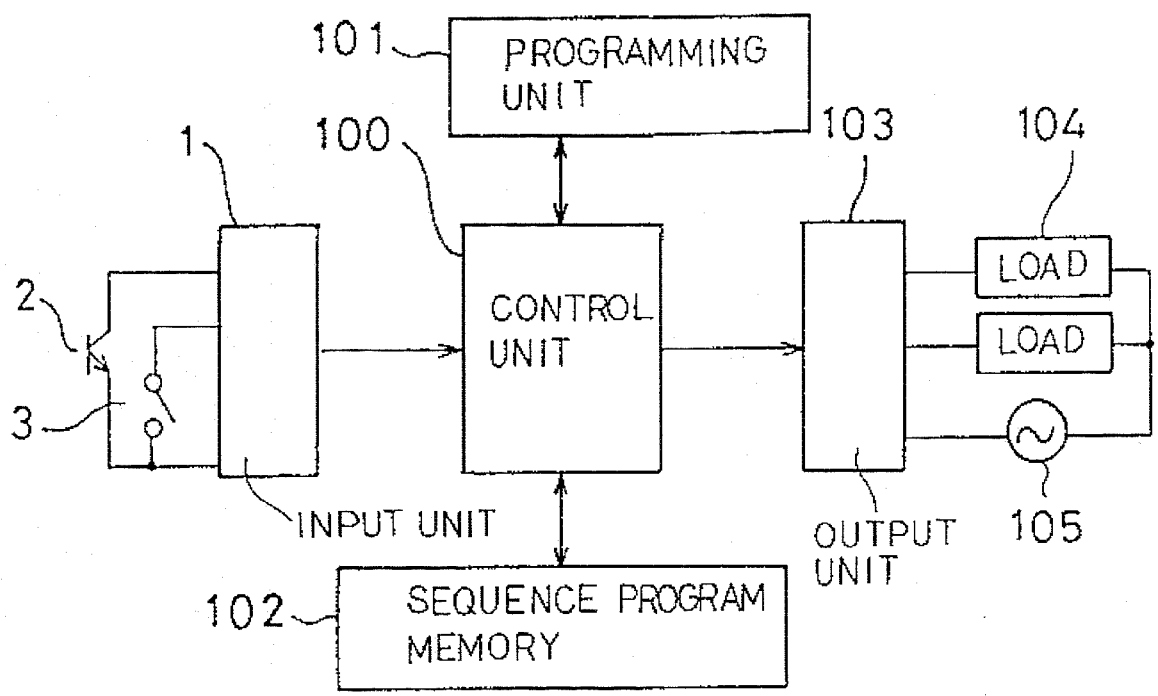
FIG. 6 is a block diagram showing the construction of a general programmable controller.
Figure 7:
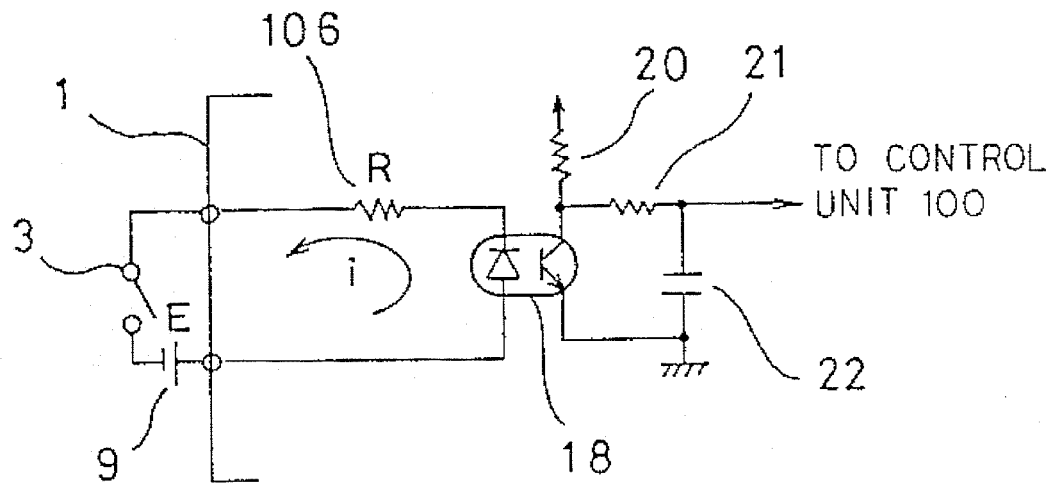
FIG. 7 is a diagram of an input circuit for explaining prior-art examples.

Referring to FIG. 1, as in the case of FIG. 6, numeral 1 indicates an input unit, and numerals 2 and 3 indicate external input devices. Numeral 4 represents a plurality of input terminals #0, #1, #2, . . . , and #n for connecting signal lines from the external input devices 2 and 3.

Numeral 5 denotes a terminal of 0 V (a ground terminal), to which one side of the external input device 2 and of the external input device 3 are commonly connected.

Numerals 9 and 10 denote an ordinary power source of 24 V and a power source of 12 V often employed in a 12 V encoder etc., respectively. In this embodiment, the power sources 9 and 10 are built into the programmable controller. The negative terminals of the power sources 9 and 10 are commonly connected to the 0 V-terminal. Terminals 6 and 7 are respectively connected to the positive terminal of the power source 9 and that of the power source 10, and they are arranged on the outer surface of the programmable controller. Shown at numeral 11 is a power source of another voltage which is fed from outside the programmable controller as may be needed.

A power feed terminal 8 serves to feed a supply voltage to internal circuitry which will be explained later.

A protective diode 12 is incorporated to protect against the case where the external power source 11 is erroneously connected in the wrong way.

Numeral 13 designates each current regulator element which is essential to the present invention, and as which a current regulator diode is mentioned by way of example. The current regulator diode has the property that, when its applied voltage changes, the internal impedance thereof changes, so a constant current is normally caused to flow therethrough. In the illustrated case of FIG. 1, the current regulator diodes 13 are connected with their cathodes lying on the side of the input terminals 4, for the external input devices of the sink type.

The necessity of the "constant current" will be explained. For example, in a case where the external input device 2 or 3 delivers a TTL output (with a working voltage of 5 V), a long wiring line incurs a high impedance and an inferior noise immunity, as a predetermined current (8 mA) needs to flow. As another example, when the external input device 2 or 3 is a contact, the current of 8 mA at the voltage of 24 V is required in consideration of the reliability of the contact. In this manner, the current value is a very important factor. In such cases, accordingly, 8 mA type elements may be adopted as the current regulator elements 13.

Numeral 14 represents protective resistors ($R_{3-0} \sim R_{3-n}$). Numerals 15 and 16 denote resistors for generating the reference voltage of comparators which will be stated below. By way of example, when the resistances of the resistors 15 ($R_1$) and 16 ($R_2$) are set at $R_1 = R_2$, half of the working voltage (the voltage of the power source ]0 connected to the power feed terminal 8) becomes the threshold voltage, and the immunity of the input circuit against noise caused by an impedance change attributable to wiring.

The aforementioned comparators are shown at numeral 17, and are equal in number to the input terminals 4. Each of the comparators 17 compares a signal from the corresponding external input device 2 or 3, with the reference voltage, and it delivers the result of the comparison as a binary value ("0" or "1"). In this embodiment, the output of the comparator becomes "1" = LOW level voltage in response to the "ON" signal of the external input device 2 or 3, and it becomes "1" = HIGH level voltage in response to the "OFF" signal.

Numeral 18 represents devices usually called "photocouplers", which transmit the signals optically and in each of which a light emitting element and a light receiving element are combined. Each of the photocouplers 18 is driven by the output of the corresponding comparator 17.

Limiting resistors 19 serve to limit currents which flow through the LED's of the respective photocouplers 18. Each of the limiting resistors 19 is connected at one end to the positive terminal of one (here, the 24 V-power source 9) of the plurality of power sources built into the programmable controller as stated before, and at the other end to the anode of the LED of the corresponding photocoupler 18. Thus, when the corresponding comparator 17 turns ON, the current limited to a predetermined magnitude flows through the LED of the photocoupler 18, and the signal is transmitted to a stage succeeding this photocoupler. Further, current limiting resistors 20 are incorporated on the light receiving sides of the photocouplers 18. Resistors 21 and capacitors 22 constitute chattering eliminator circuits which serve to eliminate the chattering of the signals of the external input devices 2 and 3.

An interface portion 23 for the control unit 100 stated before, subjects the output signal of the chattering eliminator circuit to waveshaping or changes it over to a counter circuit 24. The counter circuit 24 is constructed so that, when the external input device is one generating pulses at a high rate, such as an encoder, the high-rate pulses can be counted up and down. The input signals to the counter circuit 24 are three sorts of signals; an A-phase signal, a B-phase signal and a marker signal. The interface portion 23 has the function of changing-over its operation in accordance with a command from the control unit 100, so as to deal with the input signal as an ordinary input signal when the counter function is not used.

A switch 25 is formed on the pattern of a printed circuit board on which the circuit arrangement of this embodiment is packaged. As indicated in FIG. 1, the switch 25 is connected to a side "A" by a jumper lead, a zero-ohm resistor, or the like when the external input devices 2 and 3 are of the sink type. On the contrary, it is connected to a side "B" when the external input devices 2 and 3 are of the source type, as will be described later with reference to FIG. 2.

Here, the method of supplying the power source voltages in the circuit arrangement shown in FIG. 1 will be explained. When the external input device 2 or 3 requires the ordinary voltage (24 V), a connection (between 24 V and S) indicated at ① in FIG. 1 is made by the use of a short bar or the like. On the other hand, when the external input device 2 or 3 is one operating with 12 V, such as the encoder, a connection (between 12 V and S) indicated at ② is made, and the connection at ① is not made.

Besides, when the external input device 2 or 3 is a TTL circuit (of 5 V) or the like, a power source of 5 V is prepared as the external power source 11, and a connection (between S and 0 V) indicated at ③ is made. On this occasion, neither of the connections at ① and ② is made.

The terminals 5~8 for these connections are mounted on the outer surface of the programmable controller in an exposed manner, so that a user can connect them at will for his/her purpose.

Regarding the three terminals 6, 7 and 8, the power feed terminal 8 is centrally arranged so that the terminals 6 and 8 or the terminals 7 and 8 can be selectively connected by the short bar or the like.

According to this embodiment, irrespective of the working power source voltages, the constant currents can be caused to flow to the input terminals 4 without altering any component, owing to the functions of the current regulator elements 13. In this embodiment, however, the input circuit does not have the arrangement in which the currents flowing to the input terminals 4 are caused to directly flow to the LED's of the photocouplers 18, but it is endowed with the arrangement in which the comparators 17 are interposed between the input terminals 4 and the photocouplers 18. As stated before, accordingly, the LED's of the corresponding photocouplers 18 are driven in accordance with the results of the comparisons between the reference voltage obtained with the resistors 15 and 16 and the voltages of the respective input terminals 4. The specified power source (the 24 V-power source 9 in this embodiment) is utilized as the power source for driving the LED's, whereby current values at the turn-ON operations of the LED's can be held constant.

Figure 2:
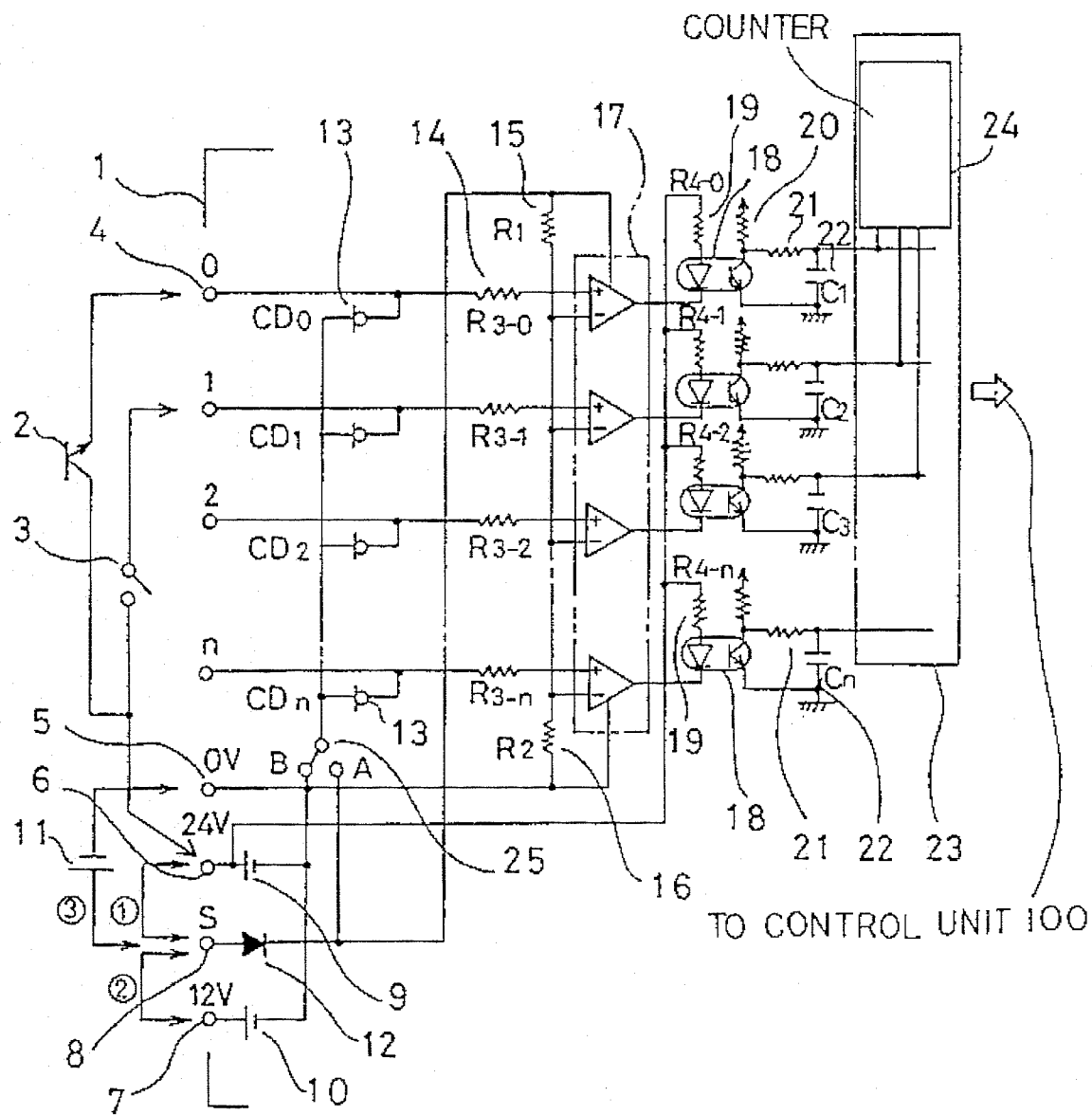
FIG. 2 is a diagram for explaining an example of application of the input circuit shown in FIG. 1.

FIG. 2 illustrates the input circuit when the external input devices 2 and 3 are of the source type. The switch 25 is connected to the "B" side, and the direction of the connections of the current regulator elements 13 are reversed.

In this case, it suffices in the packaging of the input circuit to change the connection of the jumper lead or the like of the switch 25. In point of signals, however, the outputs of the comparators 17 are inverted, and also the outputs to the control unit 100 are reversed. This situation can be coped with by using a hardware inverter circuit or a software inversion process within the interface portion 23. By way of example, the hardware inverter circuit can be easily realized by providing a plurality of exclusive-OR circuits, not shown, which take the exclusive OR's between the signal output from the switch 25 once accepted in the interface portion 23 and the outputs of the respective chattering eliminator circuits 21 and 22.

Figure 3:
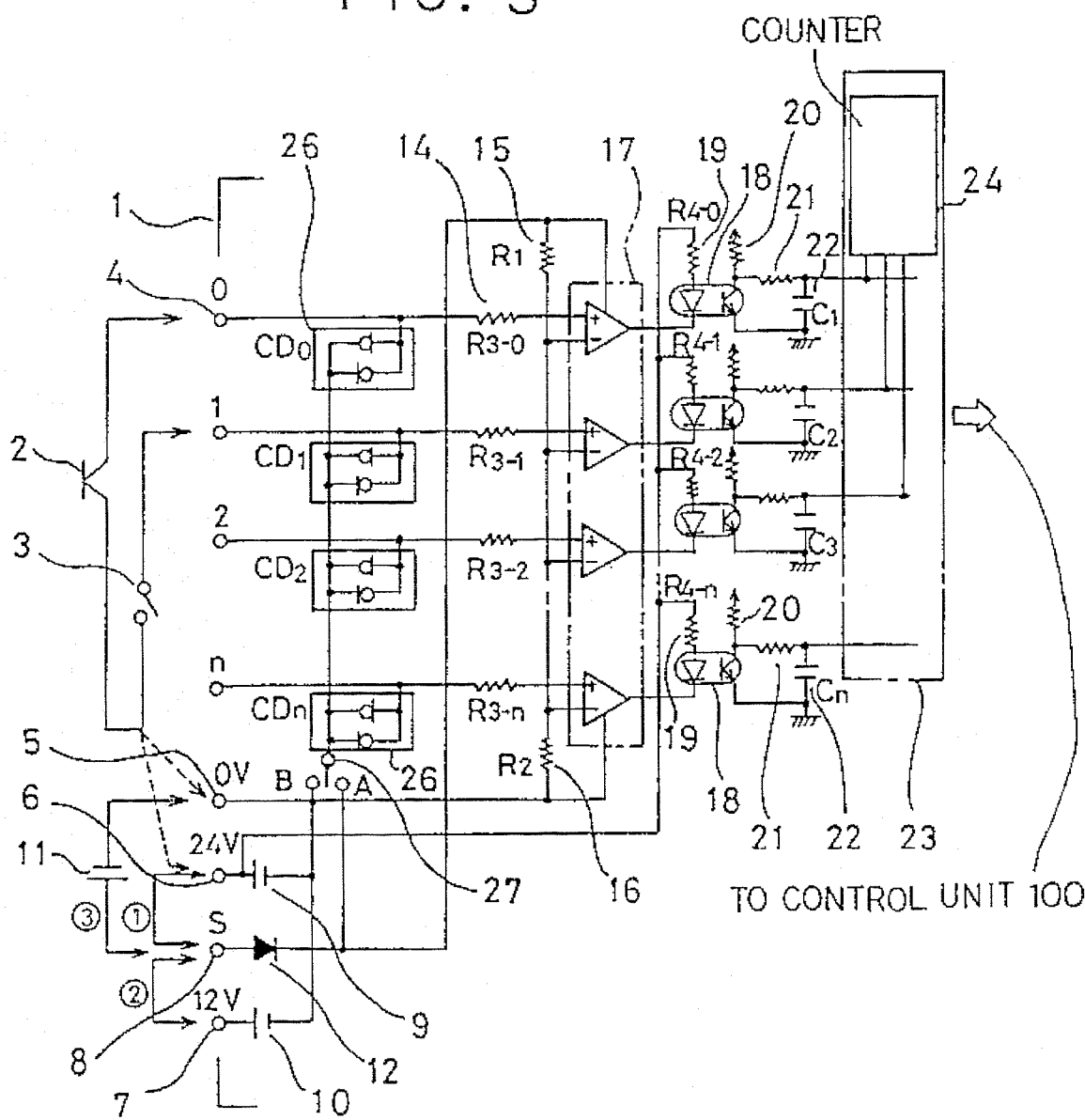
FIG. 3 is a circuit diagram showing the second embodiment of the input circuit of the programmable controller of the present invention.

FIG. 3 illustrates the second embodiment of the present invention. Referring to the figure, numeral 26 represents bidirectional current regulator elements, and numeral 27 indicates a change-over switch.

Each of the bidirectional current regulator elements 26 is in the form of a single package into which two of the current regulator elements 13 stated before are built. It has the characteristic that currents of predetermined magnitude can be caused to flow therethrough in opposite direction.

The change-over switch 27 can be manipulated for change-over on the outer surface of the programmable controller of this embodiment. The programmable controller can be properly used through the change-over, depending upon whether the external input devices 2 and 3 stated before are of the sink type or of the source type.

Here, the "A" side of the change-over switch 27 is for the sink type, and the "B" side for the source type.

The others are the same as in the first embodiment, and shall be omitted from the present description.

Incidentally, although each bidirectional current regulator element 26 is the single-package component here, it may well be simply on assembly in which the two current regulator elements 13 are connected in a parallel inverse relationship.

In addition, the inversions of the signals in the interface portion 23 may be carried out by either of the methods stated before.

Figure 4:
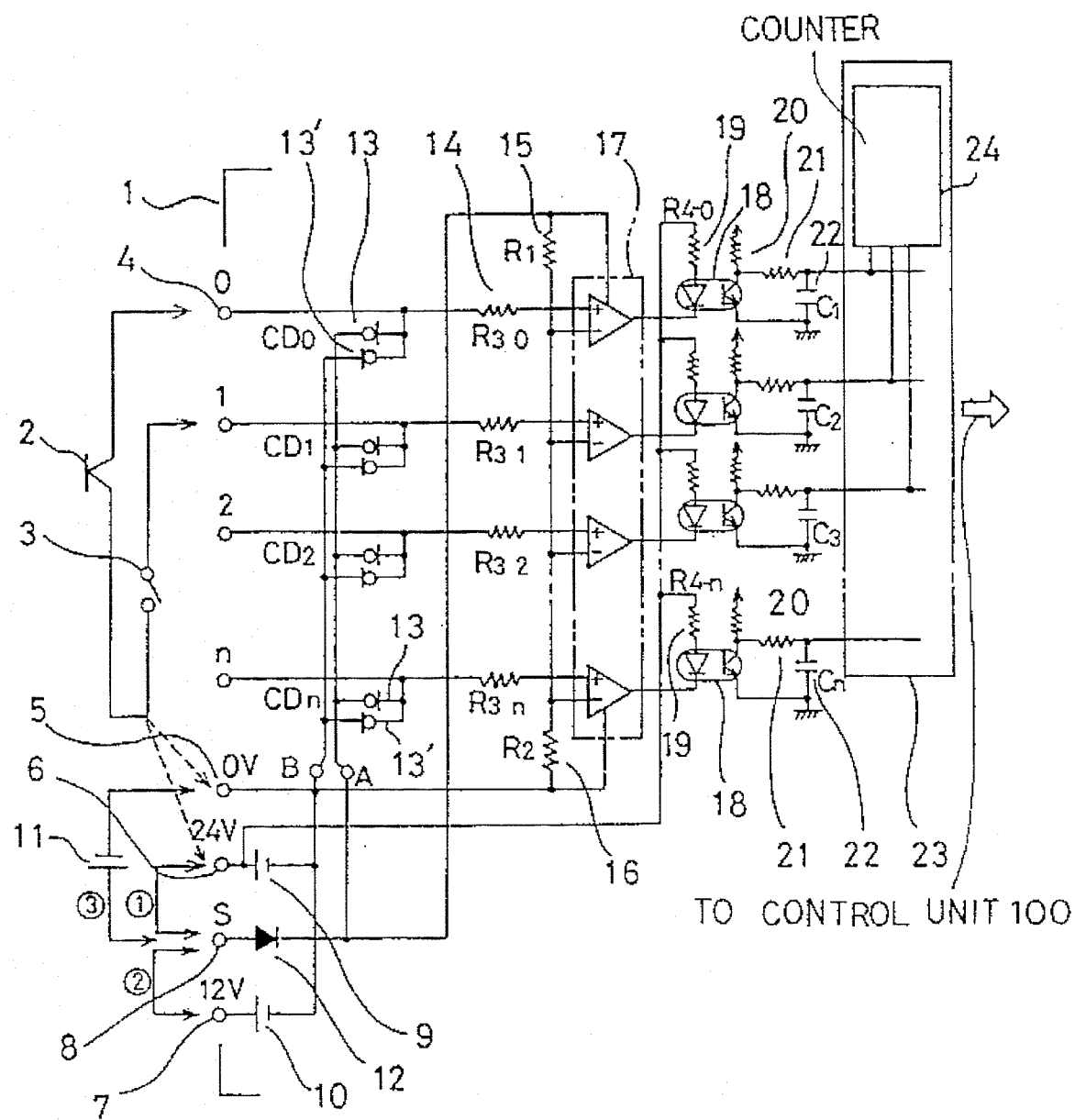
FIG. 4 is a circuit diagram showing the third embodiment of the input circuit of the programmable controller of the present invention.

Next, the third embodiment of the present invention will be described with reference to FIG. 4.

This embodiment is distinguised in that the switch 25 in the first embodiment is substituted by current regulator elements 13', the directions of which are opposite to those of the current regulator elements 13, and that the current regulator elements 13 and the current regulator elements 13' are respectively connected to a point "A" and a point "B". Thus, the change-over of the switch dependent upon the types of the external input devices is dispensed with. The inversions of the signals are the same as in the foregoing.

Figure 5:
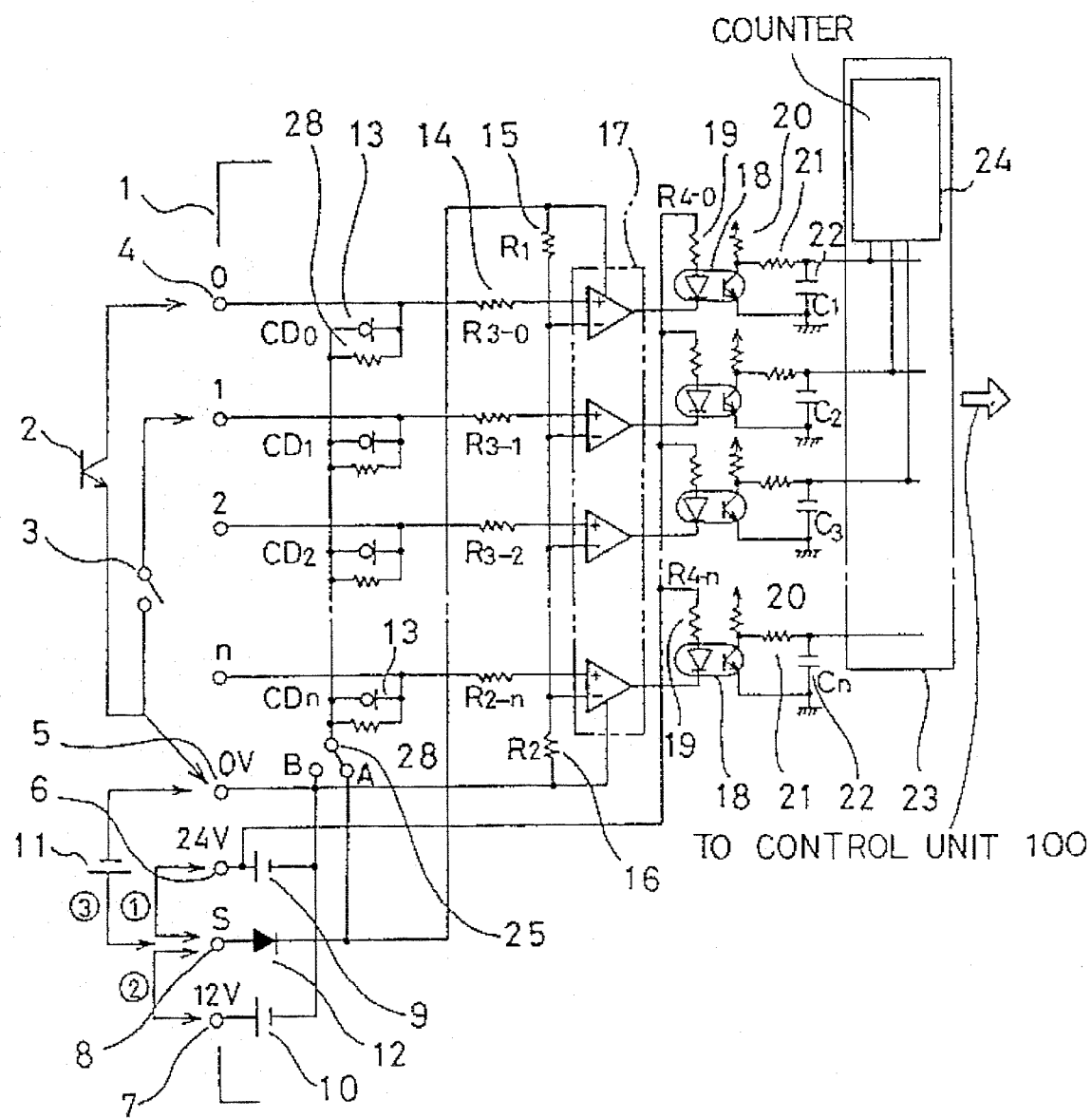
FIG. 5 is a circuit diagram showing the fourth embodiment of the input circuit of the programmable controller of the present invention.

Next, the fourth embodiment of the present invention will be described with reference to FIG. 5.

This embodiment is such that shunt resistors 28 are respectively connected in parallel with the current regulator elements 13 in the first embodiment, and that all other components are the same as in the first embodiment. The shunt resistors 28 function to increase a circuit current the current value of 8 mA as exemplified in the first embodiment is insufficient for the current regulator elements 13. By way of example, in a case where a value of at least 10 mA is required, the shunt resistors 28 increase the current value by the amount of 2 mA. The resistance value of the shunt resistors 28 may be determined by the lowest one of the power source voltages which are used.

It is to be understood that the expedient of the fourth embodiment is also applicable to the second embodiment.

Now, the limiting resistors 19 in each of the first through fourth embodiments will be detailed. Each of the photocouplers 18 has the characteristic that the input/output transfer ratio thereof changes depending upon the magnitude of current which flows through the light emitting side, namely the LED. In the signal transfer of the programmable controller, the magnitude of the current pertains to the transfer ratio of the input signal and the ON/OFF voltage values of the light receiving side, and hence, it should desirably be rendered constant in order to attain a constant transfer ratio. As stated before, in any embodiment of the present invention, the limiting resistors 19 are connected to the power source 9 built into the programmable controller. Thus, when the corresponding comparators 17 have turned ON, the preferably constant currents flow through the LED's.

According to the embodiments of the present invention thus far described, the following effects are attained: (1) The range of power source voltages to be supplied to an input circuit can be widened, so that various external input devices can be connected without altering internal circuitry; (2) a plurality of power sources of fixed voltages which are generally used are built in, whereby a user need not especially prepare a power source and can be freed from the labors of wiring etc; (3) the specifications of the external input devices can be easily conformed to and coped with; (4) photocouplers may be unidirectional ones which are economical, so that a programmable controller can be constructed inexpensively. Moreover, the transfer ratios of the photocouplers can be held constant to attain a stable performance.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A programmable controller, comprising:

memory means for storing a sequence program to operate external loads connected with said programmable controller;

processor means connected with said memory means for executing said sequence program stored in said memory means;

output means connected with said processor means for delivering processed results of said processor means to said external loads; and an input circuit connected with said processor means for receiving a signal from an external input device;

said input circuit including:
 a signal input terminal which receives said signal from said external input device,
 a power feed terminal,
 a ground terminal,
 a plurality of power source terminals,
 a plurality of built-in power sources with respective voltages, said built-in power sources are connected with respective ones of said plurality of power source terminals and are also connected with said ground terminal,
 a jumper lead for connecting said power feed terminal with one of said power source terminals which is optionally selected,
 input signal generating means disposed between said signal input terminal and said processor means for generating and delivering an input signal to said processor means in accordance with said signal from said external input device; and
 a current regulator element disposed between said input terminal and said input signal generating means.

2. A programmable controller as defined in claim 1, wherein said input signal generating means includes a reference voltage generator circuit connected with said power feed terminal for generating a reference voltage on the basis of a voltage supplied to said power feed terminal.

3. A programmable controller as defined in claim 2, wherein a predetermined constant voltage is used as a power source voltage for the input side LED of said photocoupler.

4. A programmable controller as defined in claim 1, further comprising a jumper lead for changing-over a connection of said current regulator element to said power feed terminal and to said ground terminal.

5. A programmable controller as defined in claim 1, wherein a voltage of said built-in power source is used as a power source voltage of the input side LED of said photocoupler.

6. A programmable controller as defined in claim 1, wherein said current regulator element is bidirectional current regulator element, and a change-over switch which changes-over a connection of said bidirectional current regulator element to said power feed terminal and to said ground terminal is comprised.

7. A programmable controller as defined in claim 6, wherein said input circuit further includes a resistor which is connected in parallel with said current regulator element.

8. A programmable controller as defined in claim 1, wherein said current regulator element is constituted by a pair of current regulator elements which cause currents to flow in opposite directions.

9. A programmable controller as defined in claim 8, wherein said input circuit further includes a resistor which is connected in parallel with said current regulator element.

10. A programmable controller as defined in claim 1, wherein said input circuit further includes a resistor which is connected in parallel with said current regulator element.

11. A programmable controller, comprising:

memory means for storing a sequence program to operate external loads connected with said programmable controller;

processor means connected with said memory means for executing said sequence program stored in said memory means;

output means connected with said processor means for delivering processed results of said processor means to said external loads; and an input circuit connected with said processor means for receiving a signal from an external input device;

said input circuit including:
- a signal input terminal which receives said signal from said external input device,
- a power feed terminal which is supplied with electric power from outside said programmable controller,
- a ground terminal,
- input signal generating means disposed between said signal input terminal and said processor means for generating and delivering an input signal to said processor means in accordance with said signal, and
- a current regulator element disposed between either of said power feed terminal and said ground terminal, and said signal input terminal, wherein said input signal generating means includes:
- a reference voltage generator circuit connected with said power feed terminal for generating a reference voltage based on a voltage supplied to said power feed terminal,
- a comparator connected with said signal input terminal and said reference voltage circuit for comparing said reference voltage with a voltage of said signal input terminal, and
- a photocoupler connected with an output of said comparator, said photocoupler comprising an input side light emitting diode (LED) driven by an output from said comparator, and an output side phototransistor which produces said input signal.

* * * * *